(12) United States Patent
Shibusaka

(10) Patent No.: US 6,259,671 B1
(45) Date of Patent: Jul. 10, 2001

(54) OBJECT LENS ACTUATOR

(75) Inventor: Akio Shibusaka, Yokohama (JP)

(73) Assignee: NHK Spring Co., Ltd. (JP)

( * ) Notice: Subject to any disclaimer, the term of this patent is extended or adjusted under 35 U.S.C. 154(b) by 0 days.

(21) Appl. No.: 09/297,255

(22) PCT Filed: Aug. 24, 1998

(86) PCT No.: PCT/JP98/03741
  § 371 Date: Apr. 27, 1999
  § 102(e) Date: Apr. 27, 1999

(87) PCT Pub. No.: WO99/10882
  PCT Pub. Date: Mar. 4, 1999

(30) Foreign Application Priority Data

Aug. 27, 1997 (JP) .................................................. 9-231283

(51) Int. Cl.[7] .................................................. G11B 07/04
(52) U.S. Cl. ........................................ 369/247; 369/44.14
(58) Field of Search ................................... 369/244, 246, 369/247, 248, 44.15, 44.14, 44.16, 44.22; 358/814, 823, 824

(56) References Cited

U.S. PATENT DOCUMENTS

| | | | |
|---|---|---|---|
| 4,568,142 | * 2/1986 | Iguma | 359/20 |
| 5,107,409 | * 4/1992 | Tadokoro | 362/369 |
| 5,446,721 | * 8/1995 | Sekimoto | 369/247 |
| 5,453,881 | * 9/1995 | Suzuki | 359/824 |
| 5,479,386 | * 12/1995 | Takeshita | 369/44.14 |
| 5,602,808 | * 2/1997 | Futugawa et al. | 369/44.14 |
| 5,719,834 | * 2/1998 | Futugawa et al. | 369/44.14 |
| 5,844,881 | * 12/1998 | Kasuga et al. | 369/244 |
| 6,069,867 | * 5/2000 | Ikegame | 369/248 |

FOREIGN PATENT DOCUMENTS

| | | | |
|---|---|---|---|
| 0426441 | 5/1991 | (EP) . | |
| 0553551 | 8/1993 | (EP) . | |
| 0594139 | 4/1994 | (EP) . | |
| 0311489 | * 12/1989 | (JP) | 369/247 |
| 4-245033 | 9/1992 | (JP) . | |
| 5-197991 | 8/1993 | (JP) . | |
| 6-325387 | 11/1994 | (JP) . | |
| 7-78437 | 3/1995 | (JP) . | |
| 10-79128 | 3/1998 | (JP) . | |
| 10-79129 | 3/1998 | (JP) . | |

* cited by examiner

*Primary Examiner*—Brian E. Miller
*Assistant Examiner*—Franklin D. Altman, III

(57) ABSTRACT

The peak value of the higher resonant frequency vibration of a moveable part of an object lens actuator is reduced without requiring any additional mounting space, increasing the number of component parts or adding weight by appropriately adjusting the mounting arrangement for the mass balancer for placing the gravitational center of the moveable part at a desired position as well as the dimensions and shape of the mass balancer so that the mass balancer may have the same resonant frequency as the higher harmonic resonant frequency of the moveable part, and oscillate in the opposite phase. Therefore, the vibration of the moveable part can be favorably controlled, and the rotational speed of the disk and the head speed can be increased so that the access speed of the optical disk unit or the magneto-optical disk unit may be increased.

9 Claims, 9 Drawing Sheets tracking focusing focusing focusing focusing

OBJECT LENS ACTUATOR

TECHNICAL FIELD

The present invention relates to an object lens actuator for use in optical disk units, and in particular to an object lens actuator which is characterized by a vibration control arrangement for suppressing undesired resonant vibrations.

BACKGROUND OF THE INVENTION

In a conventionally known optical head for use in an optical disk unit or a magneto-optical disk unit, to the end of accurately converging a light beam upon each track on a disk, and collecting the light reflected therefrom with a light receiving element, a moveable member carrying an object lens is supported by a base member via four sheet springs at a neutral position so as to be moveable in both the focusing and tracking directions, and the moveable member is actuated in a controlled manner by using a magnetic actuator consisting of a focusing coil, tracking coils, and permanent magnet pieces.

In such an optical head, spurious vibration modes of the spring system supporting the moveable member and the angular error of the object lens with respect to the optical axis in a low frequency range tend to impair the accuracy in converging the light beam, and this could lead to read/write errors.

In particular, there has been a growing demand to increase the rotational speed of the disk in the optical disk unit or the magneto-optical disk unit, and the response speed of the head to achieve a higher access speed, and this makes the problems associated with the vibration of the moveable member in a floating support even more serious.

It is possible, as proposed in Japanese patent laid open publication No. 7-78437 for instance, to arrange the moveable member and the coils symmetrically with respect to the optical axis, and to make the point of application of the inertial force on the moveable member coincide with the point of application of the restoring force of the spring and the electronic drive force as accurately as possible so that such undesired vibrations may be minimized. However, in such an optical head which is not adapted to place the object lens at an extreme end of the moveable part, compact and light-weight design involves some difficulty. For this reason, a design which would allow the moveable member and the coils to be arranged in an asymmetric pattern is more desirable.

For instance, the arrangement proposed in Japanese patent laid open publication No. 6-325387 comprises a main body having a relatively large vertical through hole for receiving a core standing upright from a base member, and a support piece for the object lens which extends from the main body in a direction perpendicular to the focusing direction, the focusing coil and the tracking coils being retained inside the vertical through hole. However, the support piece for the object lens tends to have a reduced thickness, and the vibration of this part could lead to a problem.

For instance, Japanese patent laid open publication No. 5-197991 discloses an arrangement in which a so-called inertia damper using a spring and a mass is used for controlling the rotation in a direction perpendicular to the focusing direction. It may be conceivable to apply this arrangement to that including an object support piece extending from the main body, and use the inertia damper to directly control the vibration of the support piece. However, it is difficult to install the inertia damper without involving optical interferences. Also, the structure tends to be highly complex while the moveable part tends to be both bulky and heavy, and the freedom in design would also be restricted.

According to the object lens actuator employing a moveable member having an object lens support piece extending from the spring-supported main body in a direction perpendicular to the focusing direction which is disclosed in Japanese patent applications Nos. 8-250982 and 8-250983 (Japanese patent laid open publications Nos. 10-79128 and 10-79129) filed by the applicant of this application, an impact damper consisting solely of a spring or consisting of a spring and a mass extends from the main body so as to strike and move away from the support piece when the main body vibrates. The impact damper vibrates and strikes the support piece in an opposite phase from that of the support piece. This suppresses higher resonant frequency vibrations of the support piece, and controls the vibration of the moveable member supporting the object lens with the result that the rotational speed of the disk and the head speed may be increased. However, this arrangement requires a certain mounting space around the object lens because the impact damper is required to be adjacent to the object lens support piece, and the moveable part tends to be undesirably bulky and massive, although not so much as an inertia damper.

BRIEF SUMMARY OF THE INVENTION

The present invention was made in view of such problems of the prior art, and its primary object is to provide an object lens actuator which can reduce the peak value of the higher frequency resonant vibration of the moveable member supporting the object lens and to thereby control the vibration thereof without increasing the overall weight so that the rotational speed of the disk and the head speed may be increased, and the access speed and storage density of the optical disk unit or the magneto-optical disk unit may be increased.

The inventors of this application have noted that in the arrangement where the shape of the moveable member and the coil mounting positions are asymmetric, because the mass of the moveable part is offset toward the object lens, a mass is required to balance the mass of the moveable part.

According to the present invention, such an object can be accomplished by providing an object lens actuator including a moveable member, the moveable member comprising: a main body resiliently supported on a base member by a spring member at a neutral position so as to be moveable in both a focusing and tracking directions, and having a focusing coil and a tracking coil; an object lens support piece extending from the main body in a direction perpendicular to the focusing direction; and a mass balancer for placing a gravitational center at a prescribed position; characterized by that: the mass balancer is provided with a resonant vibration mode which substantially agrees with a higher resonant frequency of the moveable part but is opposite in phase.

Thus by utilizing the mass balancer for placing the gravitational center of the moveable part of the actuator at a desired location, and giving it a resonant mode having a same resonant frequency as a higher resonant frequency of the actuator and an opposite phase, the peak values of the higher resonant vibrations of the moveable part of the object lens actuator can be reduced without increasing the necessary mounting space, the number of component parts or the overall weight.

BRIEF DESCRIPTION OF THE DRAWINGS

FIG. 1b is a side view of Figure 1a;

DETAILED DESCRIPTION OF THE PREFERRED EMBODIMENTS

Now the present invention is described in the following in terms of preferred embodiments thereof with reference to the appended drawings.

Figure 1A:
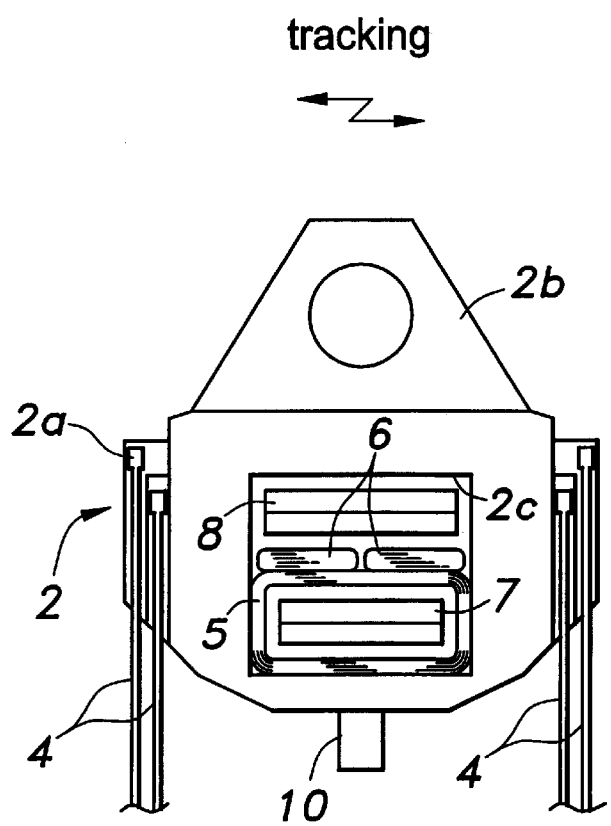
FIG. 1a is a plan view of an optical head for use in an optical head or a magneto-optical head given as a first embodiment of the present invention.
Figure 1B:
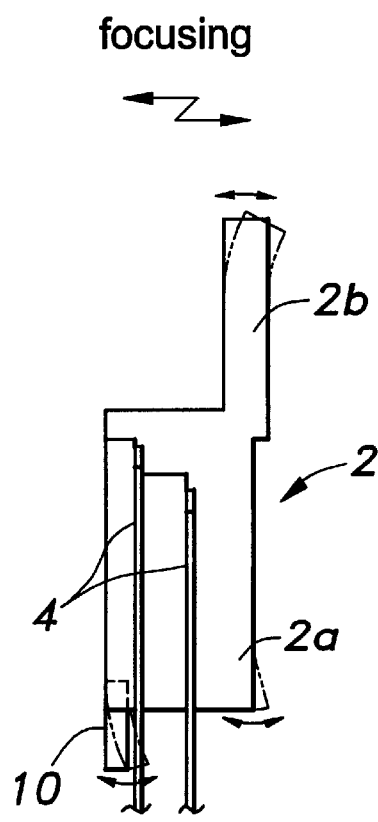

FIG. 1a is a plan view of an optical head for use in an optical disk unit or a magneto-optical disk unit given as a first embodiment of the present invention, and FIG. 1b is a side view thereof. This optical head comprises an object lens 1, a moveable member 2 supporting an object lens 1 at one end thereof via a support piece 2b, a base member (not shown in the drawing) which can be roughly moved by a drive unit provided on a system main body not shown in the drawing, and four mutually parallel sheet springs 4 serving as spring means for resiliently supporting the moveable member 2 at a neutral position so as to be moveable in both the focusing and tracking directions. A vertical through hole 2c is passed through a middle part of the main body 2a of the moveable member 2. A focusing coil 5 is attached to a part of the moveable member remote from the end supporting the object lens 1, and a pair of tracking coils 6 are attached to the front end surface of the focusing coil 5 one next to the other. A pair of magnetic units 7 and 8 each consisting of a yoke and a permanent magnet piece extend upright from the base member, and one of the magnetic units 7 is passed into the focusing coil 5 while the other magnetic unit 8 is passed through a front part of the vertical hole 2c, which is outside the focusing coil 5, so as to face the tracking coils 6.

A balancer weight 10 made of substantially rectangular metallic member for making the gravitational center of the moveable part coincide with the point of application of the actuating force either projects integrally from the rear end of the main body 2a (i.e., balancer weight 10 is of single piece construction with main body 2a) remote from the support piece 2b or is fixedly attached thereto. This balancer weight 10 is formed as a cantilever, and its width, length and other dimensions and weight are selected in such a manner that the resonant frequency of the balancer weight 10 substantially agrees with a higher harmonic resonant frequency of the moveable member 2 in the focusing direction, or that the resonant frequency of the balancer weight 10 agrees with the resonant frequency of the support piece 2b in the focusing direction in an opposing phase relationship. Such higher harmonic resonant frequencies can be determined in the design state by using an analysis, for instance, based on the finite element method.

When the support piece 2b oscillates in the focusing direction (a bending vibration mode of the lens support structure as a result of focusing drive) during the operation of the optical head, the balancer weight 10 oscillates at the same frequency but in the opposite phase, and this cancels the vibration of the support piece 2b. This is shown in the part A of FIG. 2a. FIG. 2b shows the relationship between the frequency and the vibration amplitude when the balancer weight is completely integral with the main body 2a in a conventional manner or when the balancer weight does not provide the function of canceling the vibration of the support piece 2b.

Figure 2A:
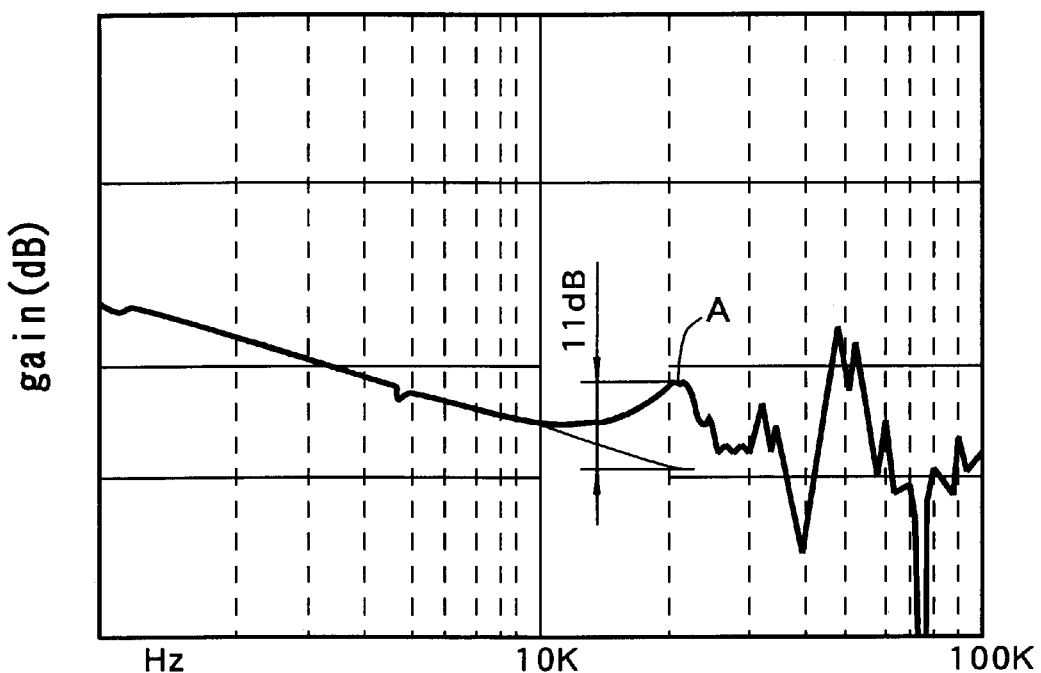
FIG. 2a is a graph showing the relationship between the frequency of the optical head moveable part and the amplitude of vibration in the first embodiment of the present invention.
Figure 2B:
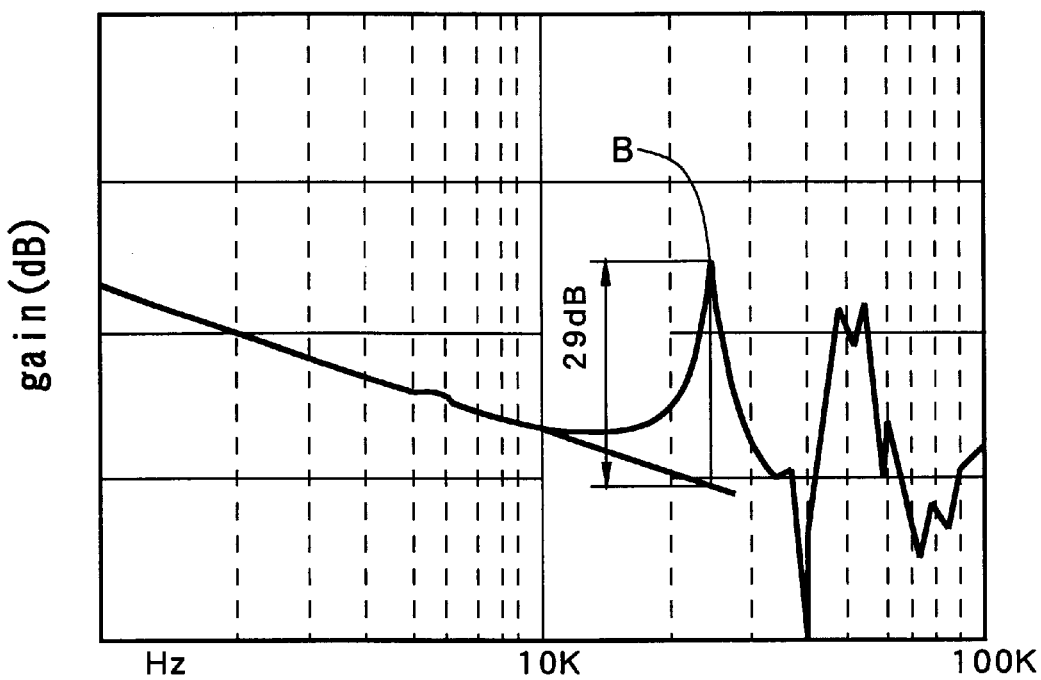
FIG. 2b is a graph showing the relationship between the frequency of the optical head moveable part and the amplitude of vibration in the conventional arrangement.

Whereas the peak of a higher resonant frequency was approximately 29 dB when the balancer weight did not provide the function of canceling the vibration of the support piece 2b, the peak was reduced to approximately 11 dB when the balancer weight is made to oscillate so as to cancel the vibration of the support piece 2b as shown in the part A of FIG. 2a.

Figure 3:
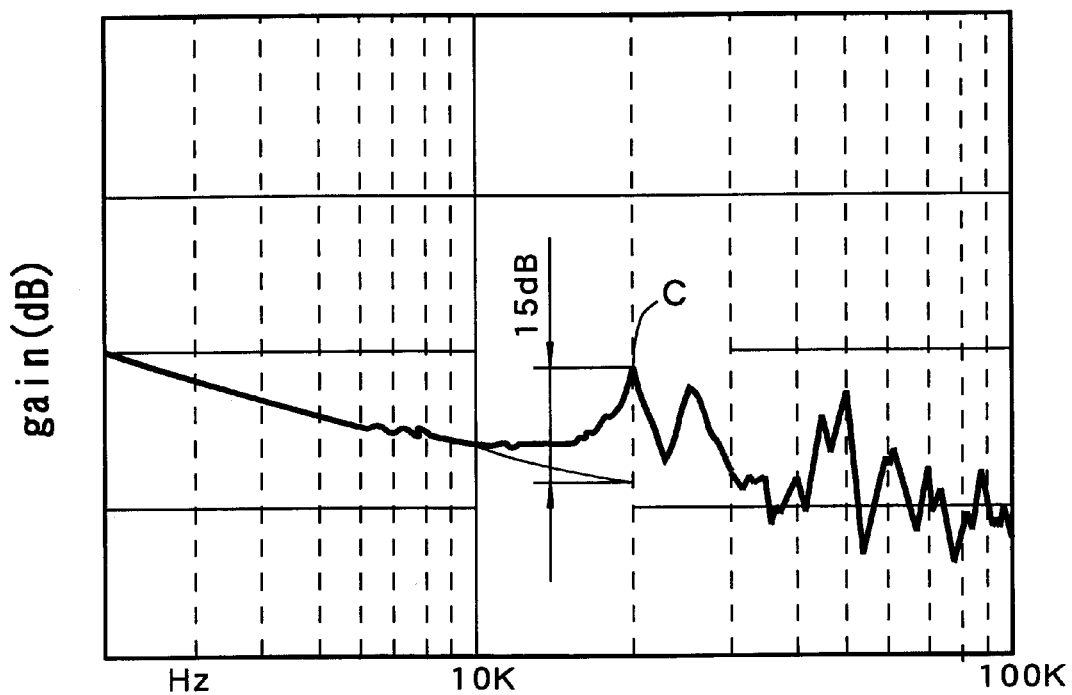
FIG. 3 is a side view similar to FIG. 1b showing an optical head given as a second embodiment of the present invention.

FIG. 3 is a side view similar to FIG. 1b showing an optical head given as a second embodiment of the present invention. The mass balancer 11 made of a metallic member comprises a thick portion 11b and a thin portion 11a having a spring action, and the thin portion 11b is fitted into a lower part of the main body 2a. In this embodiment, the mass balancer 11 forms a spring/mass system all by itself. Therefore, the spring constant can be freely determined, and the freedom in design such as the mounting position, dimensions, and weight distribution, or the freedom in overall design is improved over that of the first embodiment. The structure, effect and advantages of this embodiment are otherwise similar to those of the first embodiment.

Figure 4:
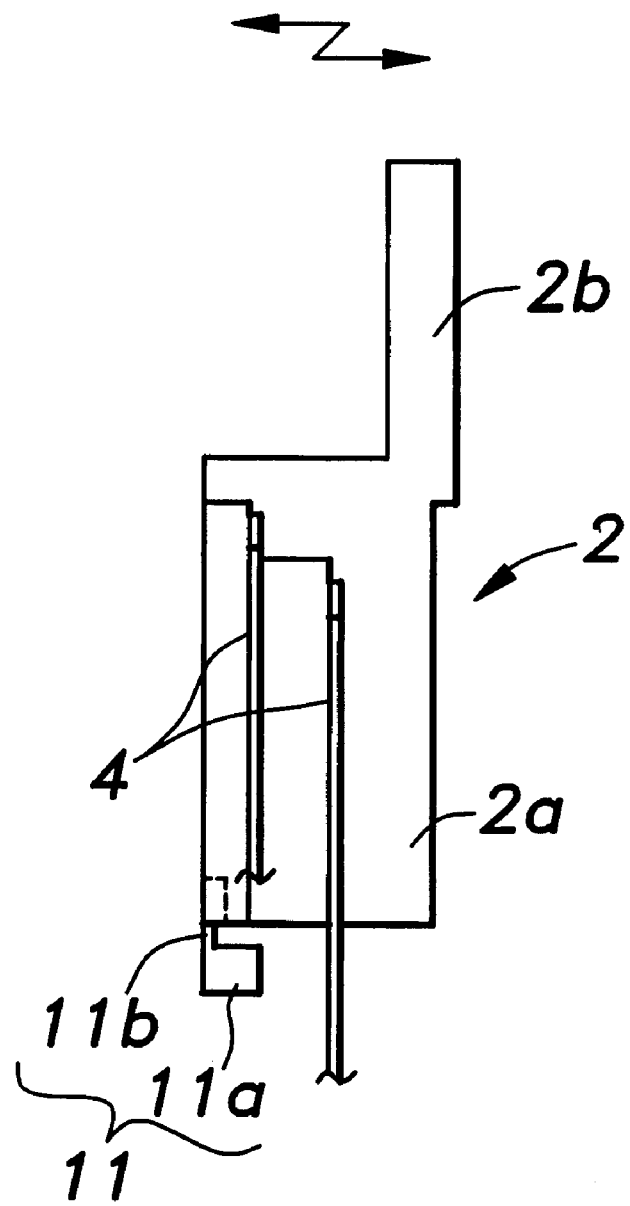
FIG. 4 is a graph showing the relationship between the frequency of the optical head moveable part and the amplitude of vibration in the second embodiment of the present invention.

The relationship between the frequency and the vibration amplitude of this embodiment is shown in FIG. 4. As shown in the part C of FIG. 4, the peak of the higher resonant frequencies was reduced from approximately 29 dB to approximately 15 dB.

Figure 5:
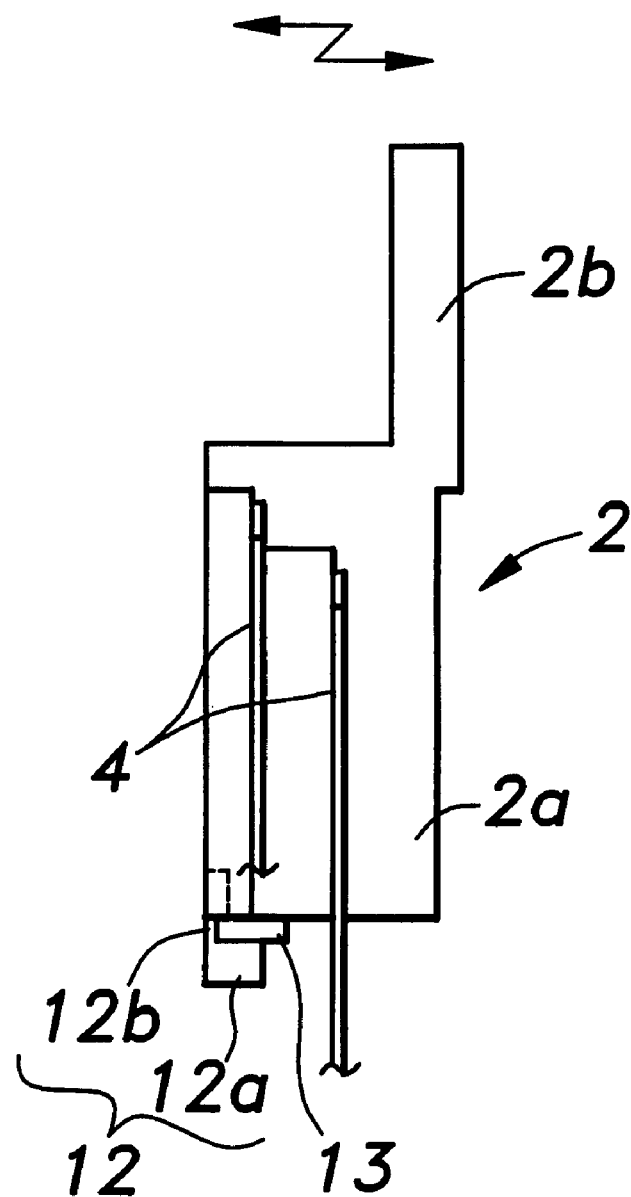
FIG. 5 is a side view similar to FIG. 3 showing an optical head given as a third embodiment of the present invention.

FIG. 5 is a side view similar to FIG. 3 showing an optical head given as a third embodiment of the present invention. In this embodiment, a metallic mass balancer 12 comprising a thick portion 12a and a thin portion 12b having a spring action similarly as the second embodiment is additionally provided with a visco-elastic member 13 consisting of silicone resin or the like interposed between the main body 2a and the thick portion 12a for damping the vibration. The damping effect thereof even further reduces the gain of the higher resonant frequency. This embodiment is otherwise similar in terms of the structure, effect and advantages, to the second embodiment.

Figure 6:
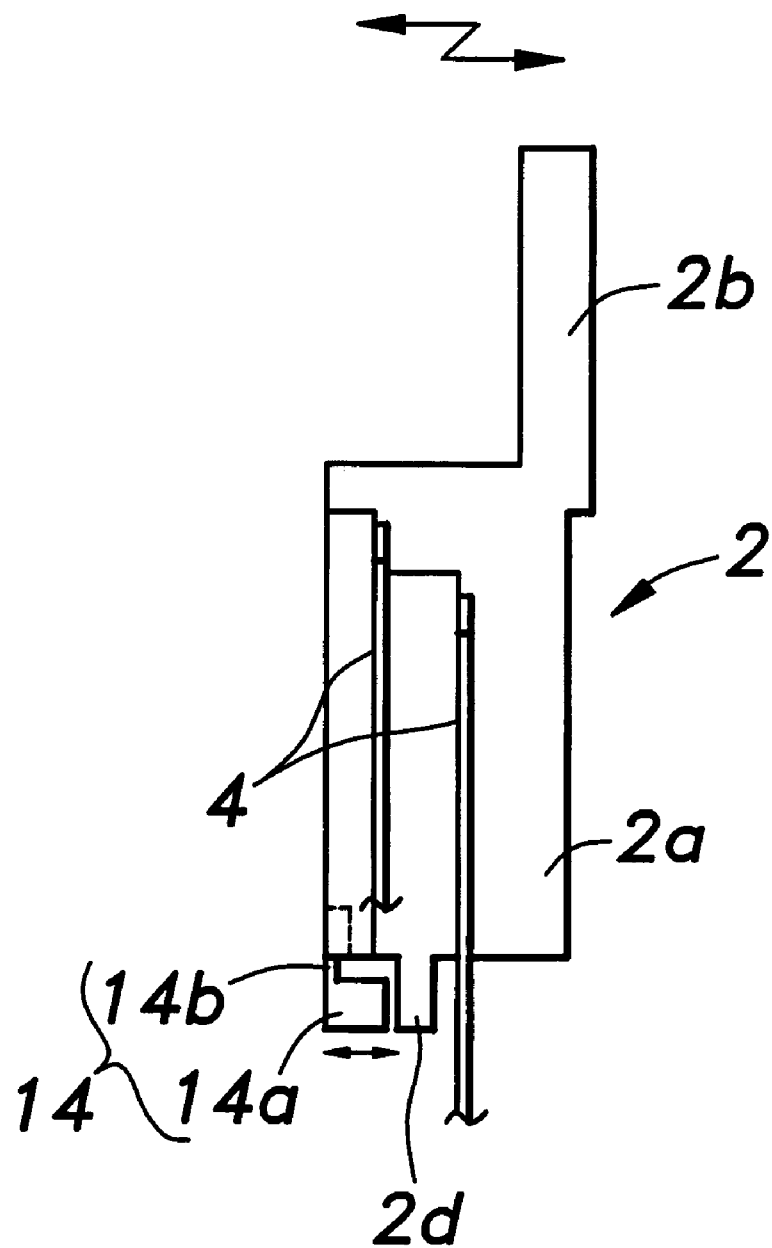
FIG. 6 is a side view similar to FIG. 3 showing an optical head given as a fourth embodiment of the present invention.

FIG. 6 is a side view similar to FIG. 3 showing an optical head given as a fourth embodiment of the present invention. In this embodiment, a metallic mass balancer 14 comprising a thick portion 14a and a thin portion 14b having a spring action similarly as the second embodiment is arranged adjacent to the main body 2a in such a manner that the part of the thick portion 14a which oscillates with a maximum amplitude is adapted to collide with the bottom surface of a projection 2d which extends integrally from the main body 2a. Therefore, according to this arrangement, when the thick portion 14a is oscillating, it can hit a bottom surface of the main body 2a so as to form a so-called impact damper, and the gain of the higher resonant frequencies can be reduced even further than the second embodiment. This embodiment is otherwise similar in terms of the structure, effect and advantages, to the second embodiment.

Figure 7:
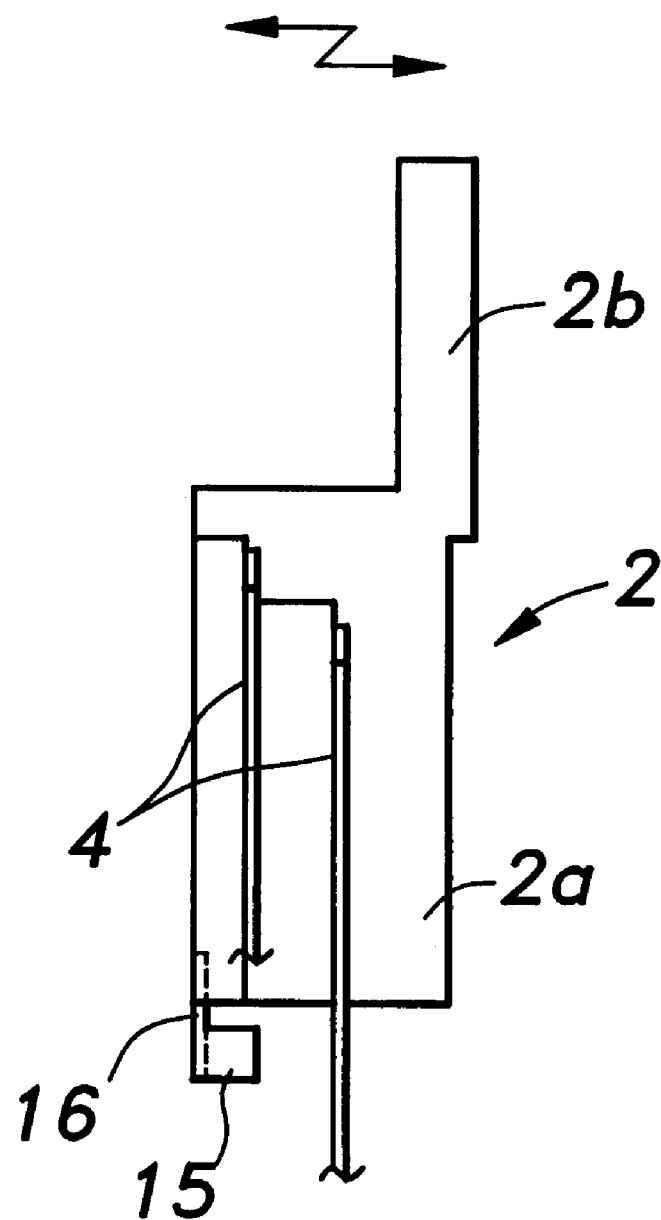
FIG. 7 is a side view similar to FIG. 3 showing an optical head given as a fifth embodiment of the present invention.

FIG. 7 is a side view similar to FIG. 1b showing an optical head given as a fifth embodiment of the present invention. In this embodiment, a metallic mass balancer 15 is fixedly attached to the main body 2a via a sheet spring 16 made of plastic. In this embodiment, the use of the plastic sheet spring simplifies the production of the mass balancer, and the management of the dimensions and weight of the mass balancer is also simplified. This embodiment is otherwise similar in terms of the structure, effect and advantages, to the second embodiment.

Figure 8:
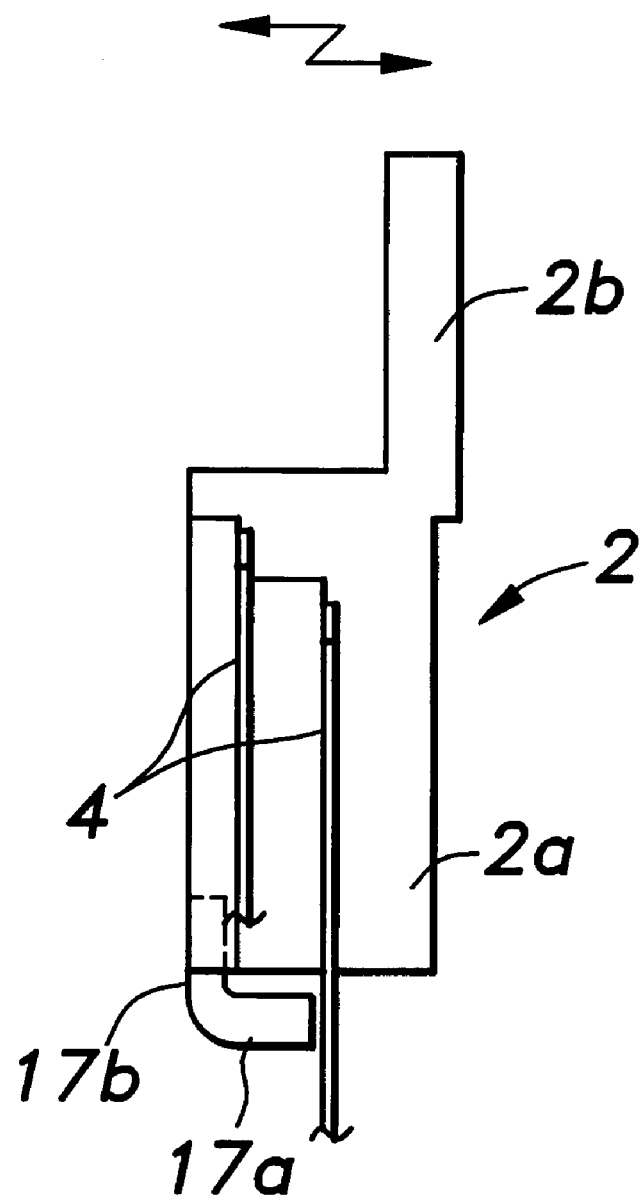
FIG. 8 is a side view similar to FIG. 3 showing an optical head given as a sixth embodiment of the present invention.

FIG. 8 is a side view similar to FIG. 1b showing an optical head given as a sixth embodiment of the present invention. The mass balancer 17 made of a plastic member comprises a thick portion 17a and a thin portion 17b having a spring action, and the thin portion 17b is fitted into a lower part of the main body 2a. The mass balancer 17 is bent at the interface between the thick portion 17a and the thin portion 17b so as to generally define the shape of letter-L. In this embodiment, the mass balancer 17 forms a spring/mass system all by itself similarly as the second embodiment, and is entirely made of plastic so that the freedom in design such as the shape is improved over the previously described embodiments. The structure, effect and advantages of this embodiment are otherwise similar to those of the second embodiment.

Figure 9A:
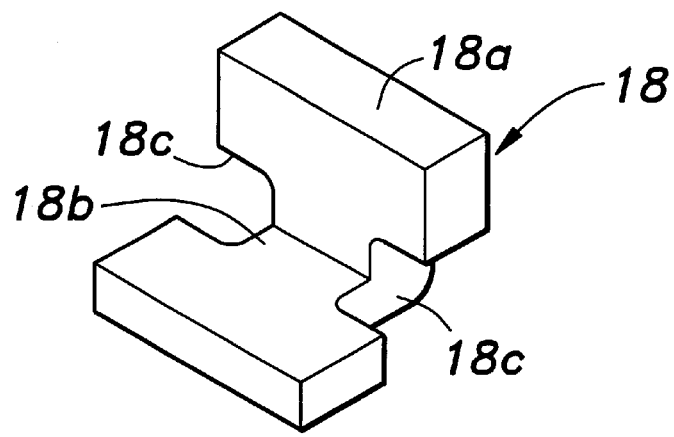
FIGS. 9a, 9b and 9c are perspective views showing different modifications from the sixth embodiment.
Figure 9B:
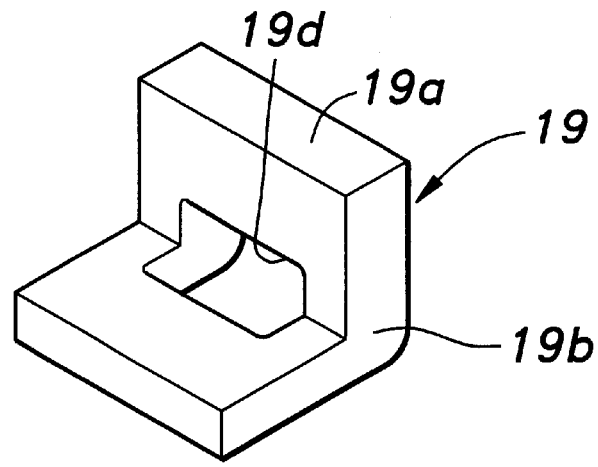
Figure 9C:
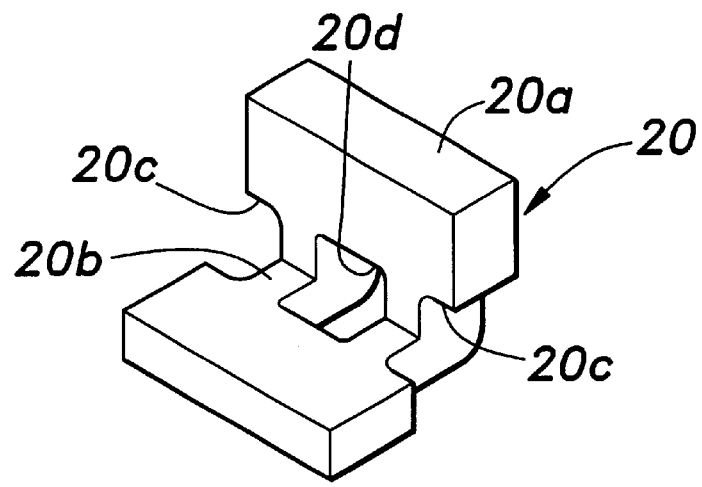

FIGS. 9a, 9b and 9c are perspective views showing different modifications from the sixth embodiment. In the structure illustrated in FIG. 9a, the thin portion 18b of an L-shaped mass balancer 18 made of plastic having a spring action is provided with a pair of notches 18c so as to reduce the width of the thin portion 18b from that of the thick portion 18a. This notches allow the adjustment of the spring action. In the structure illustrated in FIG. 9b, the thin portion 19b of an L-shaped mass balancer 19 made of plastic having a spring action is provided with a hole 19d so as to allow the adjustment of the spring action. In the structure illustrated in FIG. 9c, the thin portion 20b of an L-shaped mass balancer 20 made of plastic having a spring action is provided with a pair of notches 20c and a hole 20d so as to allow the adjustment of the spring action. These embodiments are otherwise similar to the sixth embodiment.

Only the control of the vibration in the focusing direction was discussed in connection with the above embodiments, but the vibration in the tracking direction can be similarly controlled by adjusting the dimensions and shape of the mass balancer and allowing it to oscillate also in the tracking direction.

Industrial Applicability

Thus, the present invention allows the peak values of the higher resonant frequency vibrations of a moveable part of an object lens actuator to be reduced without requiring any additional mounting space, increasing the number of component parts or adding weight by appropriately adjusting the mounting arrangement for the mass balancer for placing the gravitational center of the moveable part at a desired position as well as the dimensions and shape of the mass balancer so that the mass balancer may have the same resonant frequency as the higher harmonic resonant frequency of the moveable part, and oscillate in the opposite phase. Therefore, the vibration of the moveable part can be favorably controlled, and the rotational speed of the disk and the head speed can be increased so that the access speed of the optical disk unit or the magneto-optical disk unit may be increased.

What is claimed is:

1. An object lens actuator including a moveable member, the moveable member comprising:

a main body resiliently supported on a base member by a spring member at a neutral position so as to be moveable in both focusing and tracking directions, and having a focusing coil and a tracking coil;

an object lens support piece extending from the main body in a direction perpendicular to the focusing direction; and a mass balancer for placing a gravitational center at a prescribed position;

characterized by that:

the mass balancer extends from an end of the main body remote from the object lens support, and is provided with a resonant vibration mode which substantially agrees with a higher resonant frequency of the moveable part but is opposite in phase.

2. An object lens actuator according to claim 1, wherein the mass balancer is fixedly attached to the moveable member at a part thereof so as to form a cantilever.

3. An object lens actuator according to claim 1, wherein the mass balancer comprises a thick portion and a thin portion having a spring action so as to form a mass/spring system all by itself.

4. An object lens actuator according to claim 3, wherein the thin portion having a spring action is made of plastic.

5. An object lens actuator according to claim 3, wherein the mass balancer is made of plastic, and is bent at an interface between the thick portion and the thin portion so as to have a shape of letter-L.

6. An object lens actuator according to claim 5, wherein the thin portion is provided with a hole for adjusting the spring action thereof.

7. An object lens actuator according to claim 5, wherein the thin portion is provided with a notch for adjusting the spring action thereof.

8. An object lens actuator according to claim 3, wherein a visco-elastic member is interposed between a part of the mass balancer and the moveable member.

9. An object lens actuator according to claim 1, wherein, when the moveable member is oscillating, the mass balancer is adapted to oscillate at a substantially same frequency but in an opposite phase, and collide with the moveable member at a part thereof so as to form an impact damper.

* * * * *